June 17, 1930. J. W. SOLTIS 1,763,934
FISHING ROD
Filed April 29, 1929
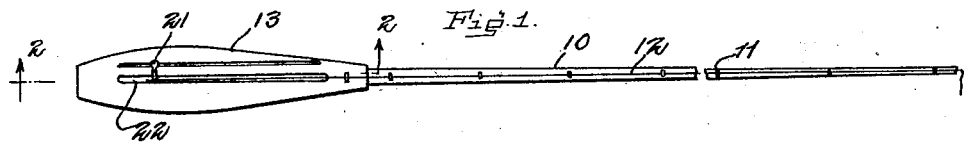
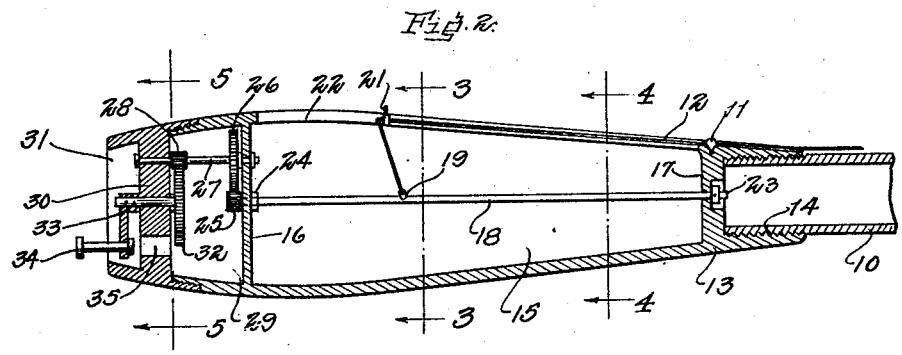
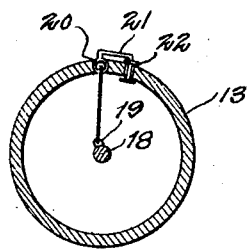 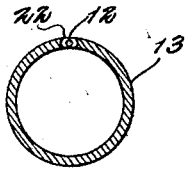 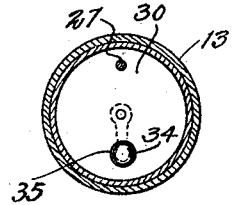
Inventor
John W. Soltis Patented June 17, 1930

1,763,934

UNITED STATES PATENT OFFICE

JOHN W. SOLTIS, OF YONKERS, NEW YORK

FISHING ROD

Application filed April 29, 1929. Serial No. 358,954.

This invention relates to improvements in fishing rods, and it is the principal object of my invention to provide a fishing rod allowing a reeling of the tackle within a barrel or handle formed with the rod under uniform and equal distribution of the line or cord within said barrel or handle.

Another object of my invention is the provision of a novel and improved fishing rod equipped with a barrel at one end thereof in which the mechanism for operating the reeling means is encased.

A further object of my invention is the provision of a fishing rod of simple and comparatively inexpensive construction, yet durable and efficient in its operation.

These and other objects and advantages of my invention will become more fully known as the description thereof proceeds, and will then be specifically defined in the appended claims.

In the accompanying drawing, forming a material part of this disclosure:

Fig. 1 is a top plan view of a fishing rod constructed according to my invention.

Fig. 2 is a longitudinal section through the handle of the rod on a greatly enlarged scale, the section being taken on line 2—2 of Figure 1.

Fig. 3 is a cross-section on line 3—3 of Figure 2.

Fig. 4 is a cross-section on line 4—4 of Figure 2.

Fig. 5 is a cross-section on line 5—5 of Figure 2.

As illustrated, the rod 10, telescoping or otherwise is equipped with the usual eyes 11 for the guidance of the line 12, and is screwed at one end into the end of a handle 13, as at 14.

Longitudinally extending through a chamber 15, formed within the handle by means of partition 16 and end wall 17 is a reel-rod or bar 18 having an eye 19 secured thereto to which one end of a cord 12 is secured which is then guided through an opening or eye 20 in the handle 13 and a tube 21 displaceably arranged in a slot 22 of the handle.

The bar 18 is journalled in the end wall 17, as at 23 and in the partition 16, as at 24 extending through the same and carrying beyond said partition a small gear 25 in mesh with a larger gear 26 on a shaft 27 carrying a small gear 28 within a chamber 29 formed by partition 16, and the end wall 30 of the handle in which a recess 31 is formed.

Gear 28 meshes with a gear 32 in chamber 29 on a shaft 33 carrying a crank 34 adapted to be slidably displaced in a recess 35 of the end wall when not in use.

The operation of my device will be entirely clear from the above specification and by simultaneous inspection of the drawing, and it will be evident that the fishing line which is kept taut by means of the usual sinker can be reeled by the proper operation of handle 34 upon rod 18 and by shifting the member 21 within slot 22 of the handle, the reeling may be done at various points of the rod 18 so as to avoid a too bulky accumulation of the line at one point.

It will be understood that I have disclosed in the present application only one form of my invention as an example and that I may make such changes therein as come within the scope of the appended claims without departure from my invention.

Having thus described my invention, what I claim as new and desire to secure by Letters Patent is:

1. A fishing rod comprising a slotted handle, containing a plurality of compartments, a rod journalled in the end walls of one compartment and extending longitudinally therethrough, a train of gears in the other compartment adapted to rotate said rod, a line guide displaceable in the slot of said handle, a line attached to said rod, the end partition formed with a recess, and a crank handle journalled in said end partition for operating said train of gears to wind the line on said rod at varying points thereof, said crank adapted to be hidden in said recess when not in use.

2. A fishing rod comprising a rod, a handle into which said rod is screwed, said handle having a longitudinally extending slot in its wall, a partition in said handle forming two endwise adjoining compartments, a reel rod journalled in the end wall of said handle and said partition and extending longitudinally through the compartment formed thereby, a line secured to said rod, a line guide displaceable within the longitudinal slot of said handle to allow a reeling of the line upon said rod at different points, a train of gears in one of said compartments adapted to rotate said rod, the end partition having a slot therein, a shaft for one of the gears of said train of gears and a crank on said gear shaft having a handle to operate said train of gears, and adapted to be hidden in the slot of said partition.

Signed at New York city, in the county of Westchester and State of New York, this A. D. 1929.

JOHN W. SOLTIS.